(12) United States Patent
Brook et al.

(10) Patent No.: US 7,214,905 B2
(45) Date of Patent: May 8, 2007

(54) COVER FOR A WELDING-TYPE POWER SOURCE

(75) Inventors: James Brook, Green Bay, WI (US);
David Radtke, New London, WI (US);
David Mann, Green Bay, WI (US)

(73) Assignee: Illinois Tool Works Inc., Glenview, IL (US)

( * ) Notice: Subject to any disclaimer, the term of this patent is extended or adjusted under 35 U.S.C. 154(b) by 464 days.

(21) Appl. No.: 10/251,390

(22) Filed: Sep. 20, 2002

(65) Prior Publication Data
US 2004/0056011 A1 Mar. 25, 2004

(51) Int. Cl.
*B23K 9/10* (2006.01)

(52) U.S. Cl. ............... 219/130.1; 219/219; 219/136

(58) Field of Classification Search ........... 219/136, 219/121.13, 121.63, 130.1
See application file for complete search history.

(56) References Cited

U.S. PATENT DOCUMENTS

| 4,196,245 A | * | 4/1980 | Kitson et al. ............... 428/198 |
| 4,619,553 A | * | 10/1986 | Fischer ..................... 405/63 |
| 4,849,273 A | * | 7/1989 | Skinner et al. ............. 428/102 |
| 5,662,978 A | * | 9/1997 | Brown et al. ............... 428/57 |
| 5,943,220 A | * | 8/1999 | Shikata et al. ............. 361/818 |
| 6,124,567 A | * | 9/2000 | Feldhausen et al. ...... 219/130.1 |
| 6,152,952 A | * | 11/2000 | Owens ........................ 607/108 |
| 6,170,687 B1 | * | 1/2001 | Griffin et al. .............. 220/4.33 |
| 6,571,998 B2 | * | 6/2003 | Godshaw et al. .......... 224/607 |
| 6,713,411 B2 | * | 3/2004 | Cox et al. ................... 442/136 |

FOREIGN PATENT DOCUMENTS

GB 2 262 034 A * 6/1993

* cited by examiner

*Primary Examiner*—Len Tran
(74) *Attorney, Agent, or Firm*—Fletcher Yoder

(57) ABSTRACT

A welding system comprising a welding-type power source and a protective cover for the welding-type power source. The protective cover may be comprised of a synthetic fabric and a polymeric fluid barrier. The protective cover may have a member secured to the synthetic fabric to enable a user to grip the member to lift the cover from the welding-type power source. The protective cover may have a plurality of eyelets to enable the cover to be drawn against the welding-type power source. The protective cover may comprise a portion adapted to receive an exhaust pipe of the welding-type power source. The portion of the cover adapted to receive the exhaust pipe may comprise a heat-resistant synthetic fabric.

30 Claims, 4 Drawing Sheets

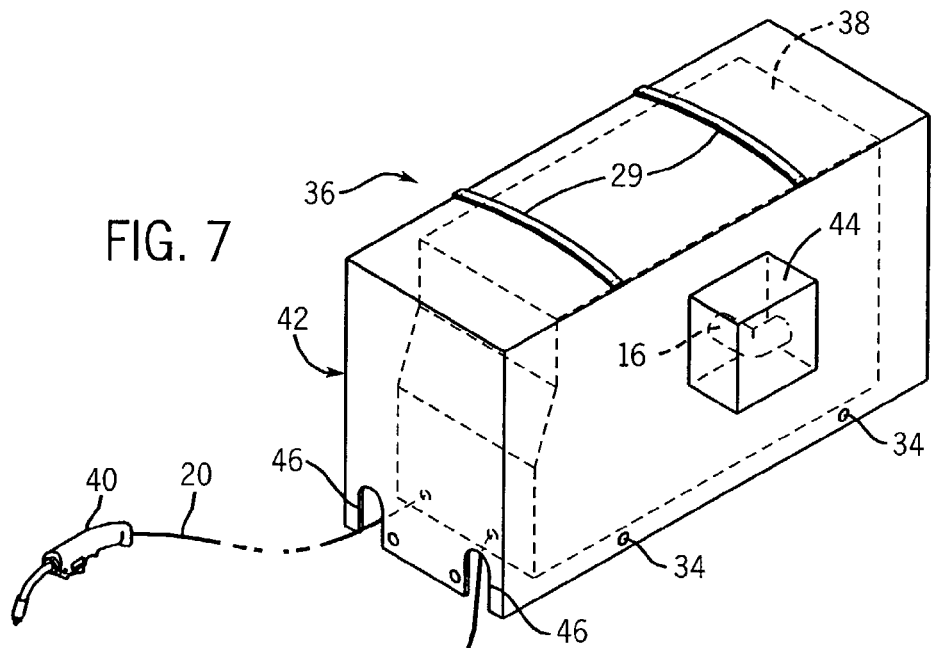
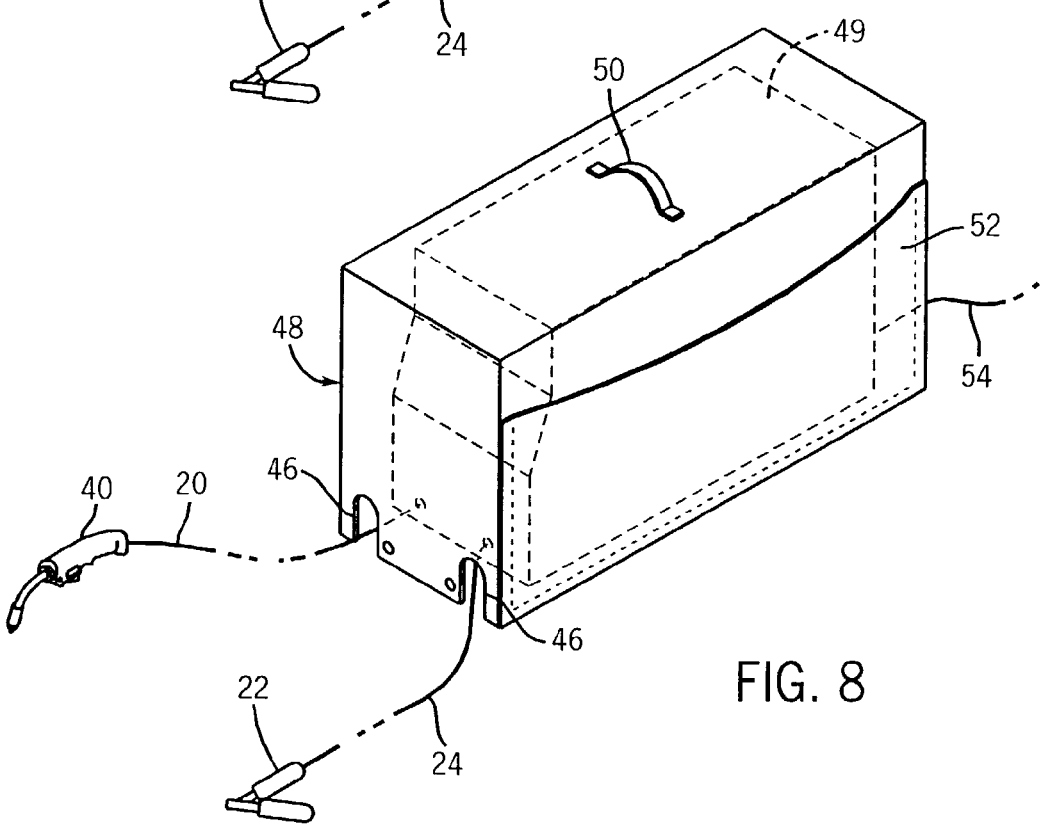

COVER FOR A WELDING-TYPE POWER SOURCE

BACKGROUND OF THE INVENTION

The present invention relates generally to the field of welding, and more particularly to a cover for a welding-type power source.

Arc welding is a process in which an electric arc is maintained between an electrode and a metal workpiece. The heat generated by the arc produces localized melting of the metal workpiece, forming a puddle of molten metal. The electrode may be a solid metal rod or a flexible wire. A torch typically is used to direct the electrode towards the metal workpiece to be welded. When the electrode comes in close proximity to or touches the metal workpiece, an electrical circuit is completed and electricity flows from the power source through the welding cable, the welding torch, the workpiece, and ground cable back to the power source. A filler material may be fed into the weld puddle when it is desired to add additional material to the weld. The weld puddle and the area surrounding the weld puddle may be protected from the atmosphere by an inert gas to prevent rapid oxidation of the weld and the surrounding metal.

Typically, the electricity for the arc welding process is provided by a power source through a welding cable coupled to the torch. A ground cable typically is used to electrically couple a metal workpiece to the power source. Some welding systems are connected to an external source of power, while others are adapted with an engine operable to drive a power source to enable the system to produce its own power. Many different types of power sources are used in arc welding. In addition, because welding, induction heating, and plasma cutting require similar high power outputs, similar power sources may be used for arc welding, induction heating, and plasma cutting.

These welding-type power sources are typically portable and are frequently exposed to the environment. A canvas cover may be used to protect a welding-type power source from the elements. These canvas covers typically are impregnated with a wax to form a barrier for water. However, the wax typically wears away or fails within a relatively short period of time. As a result, the canvas cover no longer forms a barrier to water, allowing mold and/or mildew to form on the cover. The mold and mildew may spread to the power source. In addition, a canvas cover, even when new, has an unpleasant odor. Furthermore, the heat of the exhaust of the machine may damage a canvas cover for an engine-driven welding machine, even if placed on the welding machine after the engine is turned off.

A need exists for a cover for a welding-type power source that will maintain its resistance to water and prevent mold and mildew from forming. In addition, a need exists for a cover for an engine-driven welding machine that, at least the portion of the cover adjacent the exhaust system, is heat and/or flame resistant. A need also exists for a cover that may easily be secured to the welding-type power source.

SUMMARY OF THE INVENTION

A welding system comprising a welding-type power source and a protective cover for the welding-type power source. The protective cover may be comprised of a synthetic fabric. The cover also may have a polymer fluid barrier. The protective cover may have a member secured to the synthetic fabric to enable a user to grip the member to lift the cover from the welding-type power source. The protective cover may have a plurality of eyelets to enable the cover to be drawn against the welding-type power source. The protective cover may comprise a portion adapted to receive an exhaust pipe of the welding-type power source. The portion of the cover adapted to receive the exhaust pipe may comprise a heat-resistant synthetic fabric.

BRIEF DESCRIPTION OF THE DRAWINGS

The foregoing and other advantages of the invention will become apparent upon reading the following detailed description and upon reference to the drawings in which:

FIG. 7 is a perspective view of an alternative embodiment of a welding system, according to an exemplary embodiment of the present invention; and FIG. 8 is a perspective view of an alternative embodiment of a protective cover for a welding system, according to an exemplary embodiment of the present invention.

DETAILED DESCRIPTION OF SPECIFIC EMBODIMENTS

Figure 1:
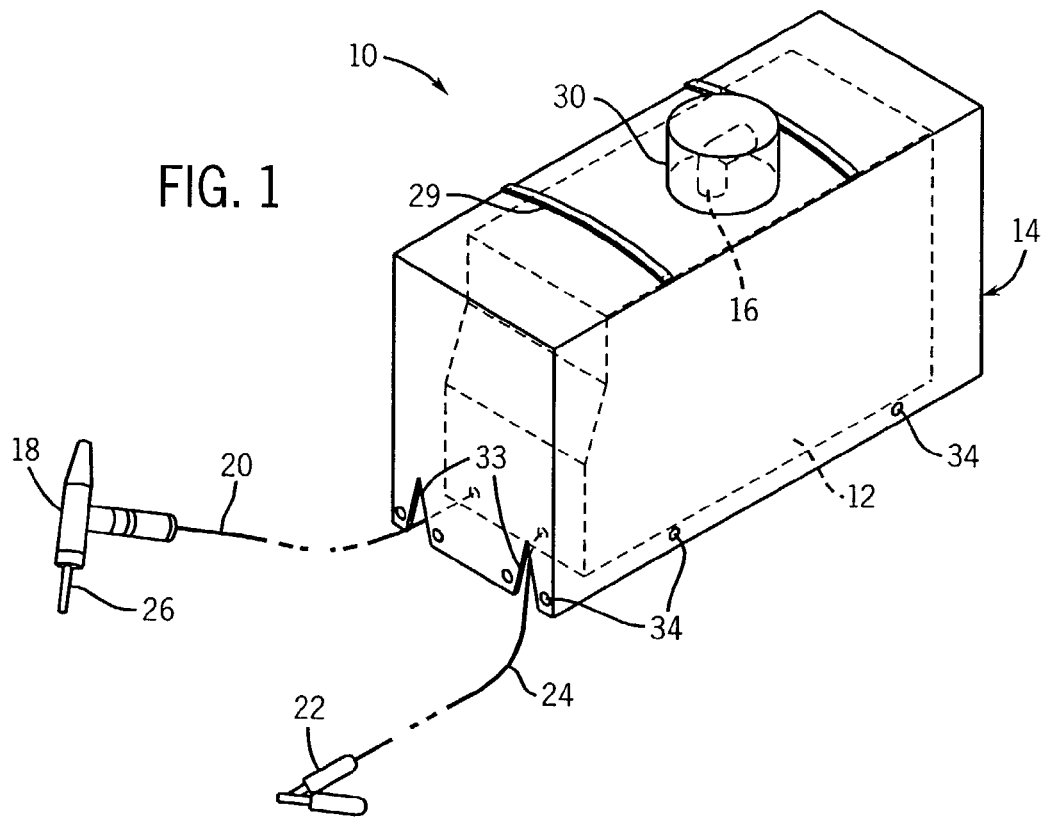
FIG. 1 is a perspective view of a welding system, according to an exemplary embodiment of the present invention.

Turning now to the drawings, and referring first to FIG. 1, a system is illustrated, designated generally by reference numeral 10. In the illustrated embodiment, the system 10 comprises a welding-type power source 12 and a protective cover 14. Welding-type power source or supply, as used herein, includes welding, plasma cutting, and induction heating power sources and supplies. In regard to welding, the welding-type power source 12 may be a power source used in a variety of welding applications, such as MIG ("metal inert gas") welding, TIG ("tungsten inert gas") welding, SMAW ("submerged arc welding"), and stick welding.

In the illustrated embodiment, the welding system 10 is adapted for TIG welding. However, as discussed above, the system 10 may be adapted for welding, plasma cutting, induction heating, or any application using a welding-type power source. In the illustrated embodiment, the welding-type power source 12 is engine-driven. Consequently, the welding-type power source 12 has an exhaust pipe 16. However, a non-engine-driven power source may also be used. For example, a welding-type power source may also be adapted to connect to a source of electrical power, such as an electrical outlet, to produce the desired power for welding operations.

In the illustrated embodiment, power from the welding-type power source 12 is provided to a TIG welding torch 18 by a welding cable 20 connected to the welding-type power source 12. A ground clamp 22 is used to electrically couple a workpiece to the welding-type power source 12. A ground cable 24 is used to connect the ground clamp 22 to the welding-type power source 12. The TIG welding torch has an electrode 26. When the electrode 26 is placed against, or in close proximity to, the workpiece, electricity flows from the electrode 26, through the workpiece, to the ground clamp 22. The electricity produces localized melting of the workpiece.

Figure 2:
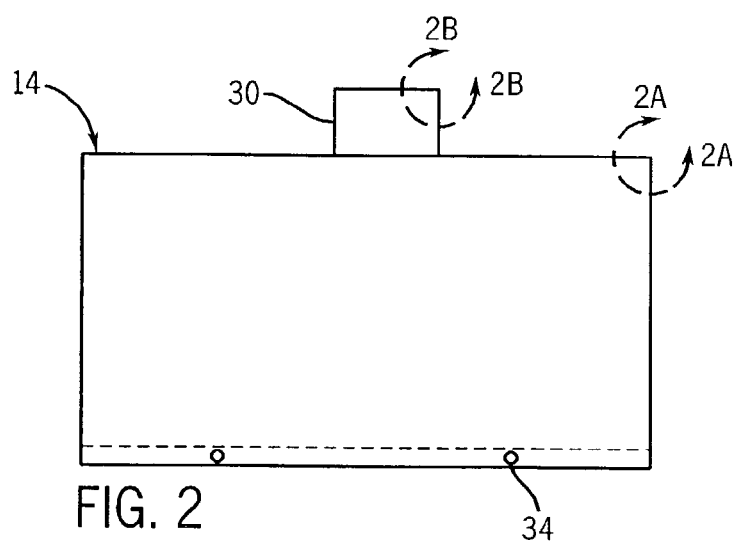
FIG. 2 is a side view of a waterproof cover for a welding-type power source, according to an exemplary embodiment of the present invention.
Figure 2A:
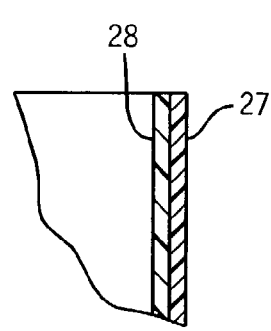
FIG. 2A is a cross-sectional view of the cover of FIG. 2, taken generally along line 2A—2A of FIG. 2.

Referring generally to FIGS. 1–6, the cover 14 is waterproof and adapted to fit over the welding-type power source 12. As best illustrated in FIG. 2A, the illustrated embodiment of the protective cover 14 is comprised of a woven synthetic material 27, such as a nylon fabric. The cover 14 is comprised of a number of pieces of the woven synthetic material 27 that are attached together, such as by sewing, to form the cover 14. The pieces are adapted to enable the cover 14 to fit over the welding-type power source 12. A plurality of different covers may be used for various welding power supplies in a product line of welding power supplies. Each of the plurality of cover may be adapted to cover one or more specific welding power supplies in the product line. In the illustrated embodiment, the cover 14 is shaped specifically to cover the illustrated welding-type power source 12. However, the cover 14 also may be adapted to fit over welding power supplies of a general size and shape.

In addition, the woven material has a layer of a polymeric material 28 extending over the woven synthetic material to waterproof the cover. The polymeric layer may be a coating on the surface of the synthetic woven material, either the interior or exterior, or as a separate layer of material secured to the woven synthetic material, such as by sewing. Preferably, the cover 14 is comprised of 1000 Denier vinyl-backed nylon. The cover 14 may also comprise an ultraviolet light inhibitor to protect the cover 14 from damage caused by exposure to the sun. In addition, an agent to inhibit the growth of mold and mildew may be added to the cover 14.

Figure 3:
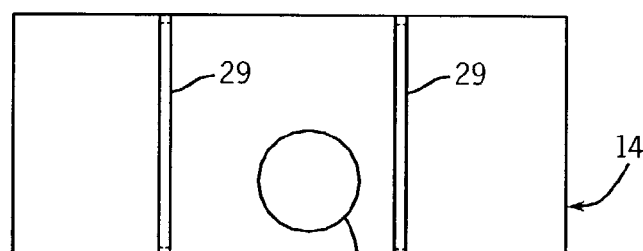
FIG. 3 is a top view of the waterproof cover of FIG. 2.

Referring generally to FIGS. 1 and 3, in the illustrated embodiment, the cover 14 has two straps 29 to enable a user to remove and install the cover 14. However, the cover 14 may be adapted with more or less straps 29. Preferably, the straps 29 are comprised of a synthetic material, such as polypropylene webbing, that are easily gripped by a user.

Figure 2B:
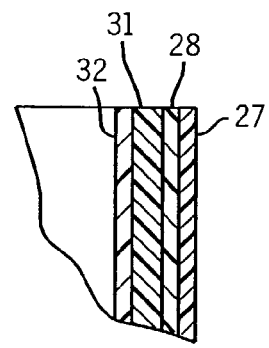
FIG. 2B is a cross-sectional view of a portion of the cover of FIG. 2 that is adapted to receive the exhaust pipe of the welding-type power source, taken generally along line 2B—2B of FIG. 2.

Referring generally to FIGS. 1–6, the illustrated cover 14 also has an extension 30 that is adapted to enable the cover to receive the exhaust pipe 16 extending from the engine-driven welding-type power source 12. As best illustrated in FIG. 2B, the illustrated extension 30 is adapted with a liner comprising a second woven synthetic material 31. The second woven synthetic material reinforces the extension 30 and is comprised of a heat and/or flame-resistant material. Preferably, the second woven synthetic material comprises 1000 Denier ballistic nylon with a polymer coating 32, such as urethane.

Figure 4:
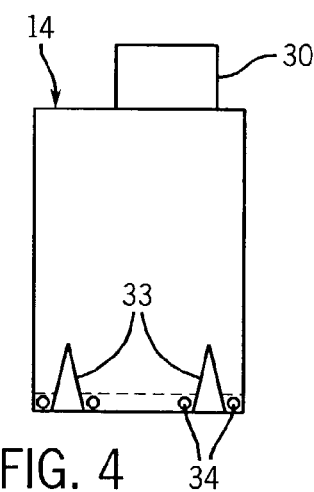
FIG. 4 is a front view of the waterproof cover of FIG. 2.
Figure 5:
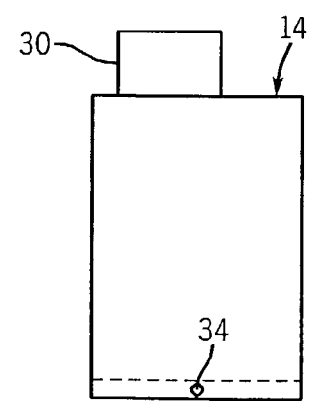
FIG. 5 is a rear view of the waterproof cover of FIG. 2.
Figure 6:
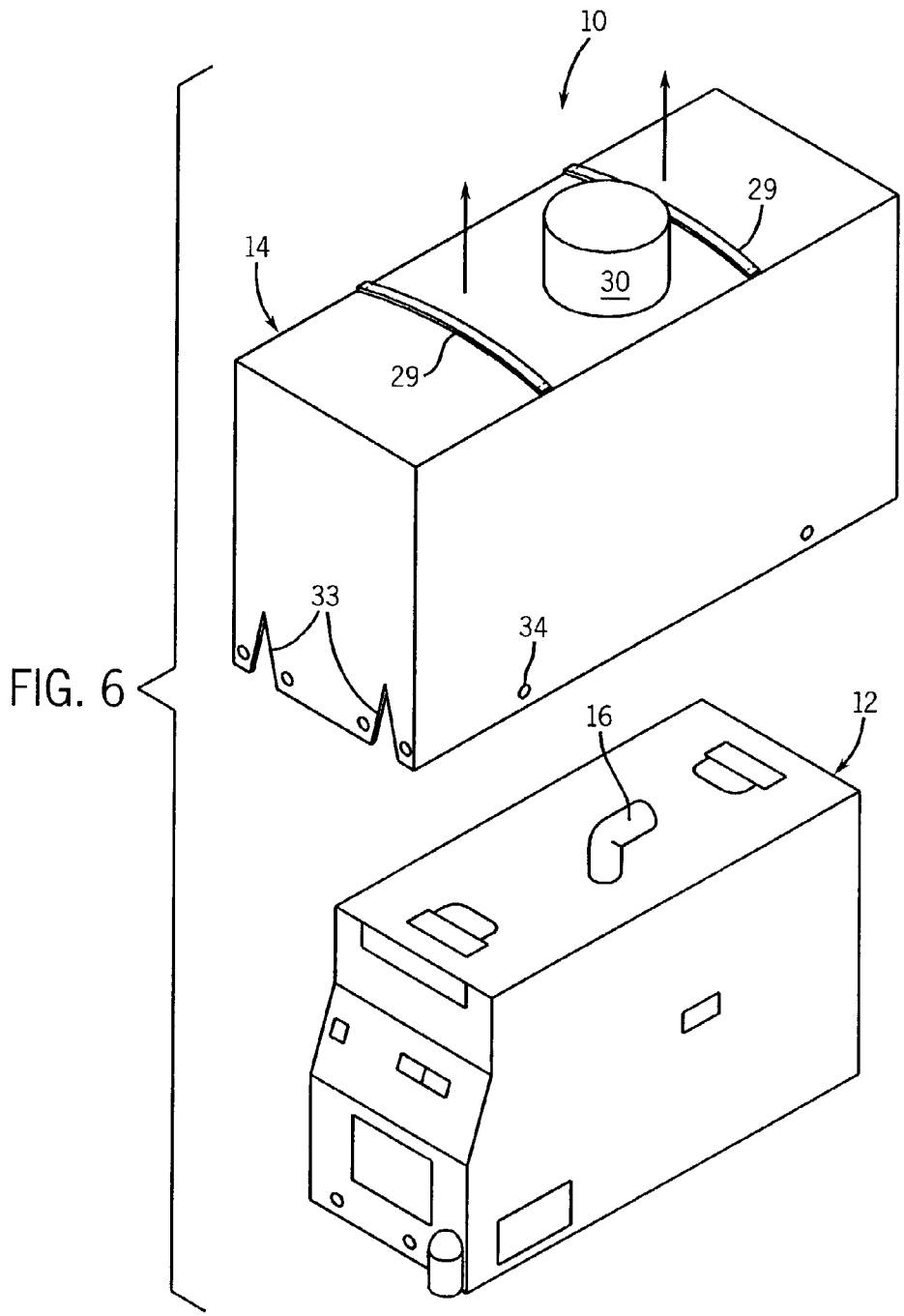
FIG. 6 is a perspective view of a welding-type power source and a waterproof cover for the welding-type power source, illustrating the removal of the waterproof cover from the welding-type power source, according to an exemplary embodiment of the present invention.

Referring generally to FIGS. 1 and 4, the illustrated embodiment of the cover 14 also has a plurality of cutouts 33. The cutouts 33 are adapted to enable the cover 14 to be fully drawn over the welding-type power source 12 and allow the welding cable 20 and ground cable 24 to extend from the welding-type power source 12. In this embodiment, the cutouts 33 are triangular. However, other shaped cutouts may be used.

The cover 14 has an open end to enable the cover 14 to be placed over the welding-type power source 12. In addition, the cover 14 has a plurality of eyelets 34 disposed around the perimeter of the cover 14 adjacent to the open end. The eyelets 34 enable a drawstring (not shown) to be routed through the eyelets around the perimeter of the cover 14. The drawstring is used to close the open end of the cover 14 against the welding-type power source 12 to secure the cover to the welding-type power source 12 and to prevent contaminants from entering the region between the cover 14 and the welding-type power source 12 through the open end of the cover 14.

Referring generally to FIG. 7, an alternative embodiment of a welding system 36 is illustrated. In this embodiment, the system 36 is adapted for use as a MIG welding system. The welding-type power source 38 is adapted for MIG welding. In this embodiment, the torch 40 is a MIG welding gun 42. An alternative embodiment of a protective cover 42 also is illustrated. In this embodiment, the exhaust pipe 16 is disposed on a side of the welding-type power source 38, rather than the top. A cover extension 44 is disposed on the side of the cover 42 to receive the exhaust pipe 16. In addition, in the illustrated embodiment, the extension 44 is box-shaped, rather than cylindrical. Furthermore, the illustrated protective cover 42 is adapted with oval cutouts 46, rather than triangular cutouts.

Referring generally to FIG. 8, a second alternative embodiment of a welding cover 48 is illustrated. In the illustrated embodiment, the cover is adapted to cover a non-engine-driven welding-type power source 49. The cover 48 has a rigid handle 50, rather than straps. The handle 50 may be used to remove the cover 48 from the welding-type power source, as well as place the cover 48 over the welding-type power source. In addition, in the illustrated embodiment, the cover 48 has a storage pouch 52 located on the side of the cover 48 to enable accessories to be stored in the cover 48. The storage pouch 52 also may have a flap to cover the pouch 52. Power is applied to the welding-type power source 49 by a power cord 54 that is connected to an outlet to provide power to the welding-type power source.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding power source protective cover comprising:
   a woven synthetic fabric comprising nylon; and
   a polymeric fluid barrier disposed on the woven synthetic fabric to form a cover material, wherein the polymeric fluid barrier comprises a polymeric backing for the woven synthetic fabric, the polymeric backing comprising vinyl;
   wherein the cover material is assembled to define a volume corresponding to a general outline of a welding power source.

2. The protective cover as recited in claim 1, wherein the woven synthetic fabric comprises nylon.

3. The protective cover as recited in claim 1, wherein the polymeric fluid barrier comprises a polymeric coating disposed on a surface of the woven synthetic fabric.

4. The protective cover as recited in claim 1, wherein the woven synthetic fabric comprises 1000 Denier nylon.

5. The protective cover as recited in claim 1, comprising a plurality of eyelets disposed within holes through the woven synthetic fabric to enable the cover to be tightened around the welding power source.

6. The protective cover as recited in claim 1, comprising a portion adapted to receive an exhaust pipe of the welding power source.

7. The protective cover as recited in claim 6, wherein the portion comprises a second woven synthetic fabric disposed on an interior surface of the cover.

8. The protective cover as recited in claim 7, wherein the second woven synthetic fabric comprises a flame-resistant material.

9. The protective cover as recited in claim 8, wherein the second woven synthetic fabric comprises 1000 Denier ballistic nylon coated with polyurethane.

10. The protective cover as recited in claim 1, wherein the woven synthetic fabric is adapted with a storage pouch.

11. The protective cover as recited in claim 1, comprising at least one cutout adapted to extend around a cable extending from the welding power source with the cover disposed over the welding power source.

12. The protective cover as recited in claim 1, further comprising a lifting member secured to the woven synthetic fabric and adapted to enable a user to grip the lifting member to remove the cover from the welding power source.

13. The protective cover as recited in claim 1, wherein the woven synthetic fabric comprises an ultraviolet inhibitor.

14. The protective cover as recited in claim 1, wherein the woven synthetic fabric is adapted to resist mold and mildew.

15. A welding power source protective cover comprising:
a waterproof synthetic material adapted to extend over a welding power source, wherein the waterproof synthetic material comprises a woven synthetic fabric and a polymer layer; and
a member secured to the waterproof synthetic material, the member being adapted to be gripped by a user to remove the waterproof synthetic material from the welding power source.

16. The protective cover as recited in claim 15, wherein the member comprises at least one strap.

17. The protective cover as recited in claim 15, wherein the member comprises at least one handle.

18. A welding power source protective cover comprising:
a synthetic fabric cover adapted to extend over a welding power source, wherein the cover has a generally rectangular shape with an open bottom to enable the cover to receive the welding power source; and
a securing portion adapted to enable the open end of the cover to be drawn against the welding power source, wherein the securing portion comprises a plurality of eyelets disposed around the perimeter of the cover, the eyelets being adapted to receive a flexible securing member therethrough.

19. The protective cover as recited in claim 18, wherein the securing portion comprises a drawstring adapted to extend around the welding power source through the plurality of eyelets.

20. A welding power source protective cover comprising:
a first portion adapted to extend over a welding power source, wherein the first portion is waterproof and comprises:
a synthetic fabric; and
a polymeric material adapted to form a barrier to fluid, wherein the polymeric material is disposed on the interior surface of the synthetic fabric; and
a second portion adapted to receive a portion of an exhaust system of the welding power source, wherein the second portion comprises a flame-resistant synthetic fabric liner.

21. The protective cover as recited in claim 20, wherein the synthetic fabric comprises nylon.

22. The protective cover as recited in claim 20, wherein the flame-resistant synthetic fabric liner comprises a polyurethane coating.

23. The protective cover as recited in claim 20, wherein the second portion extends outward from the first portion.

24. A welding system, comprising:
a welding power source; and
a waterproof synthetic fabric cover having an open bottom to enable the cover to be disposed over the welding power source, wherein the waterproof synthetic fabric cover comprises nylon and a polymer backing comprising vinyl.

25. The welding system as recited in claim 24, wherein the welding power source is engine-driven and has an exhaust pipe extending therefrom, the cover comprising a heat-resistant portion adapted to receive the exhaust pipe.

26. The welding system as recited in claim 25, wherein the heat-resistant portion comprises a heat-resistant synthetic fabric liner disposed on an inner surface of the cover.

27. A welding power source protective cover comprising:
a synthetic fabric comprising nylon and adapted to be disposed over a welding power source, wherein the synthetic fabric comprises at least one cutout portion oriented on the protective cover to align with a cable connector of the welding power source when the protective cover is disposed over the welding power source; and
a polymer fluid barrier comprising vinyl and adapted to be disposed over the welding power source.

28. The protective cover as recited in claim 27, wherein the welding power source comprises an arc welding power source.

29. The protective cover as recited in claim 27, wherein the welding power source comprises a plasma cutting power source.

30. The protective cover as recited in claim 27, wherein the welding power source comprises an induction heating power source.

* * * * *